(12) United States Patent
Even

(10) Patent No.: US 8,763,323 B1
(45) Date of Patent: Jul. 1, 2014

(54) GRAIN SILO LID

(76) Inventor: Westley A. Even, Watertown, SD (US)

(*) Notice: Subject to any disclaimer, the term of this patent is extended or adjusted under 35 U.S.C. 154(b) by 498 days.

(21) Appl. No.: 13/084,016

(22) Filed: Apr. 11, 2011

Related U.S. Application Data

(60) Provisional application No. 61/327,276, filed on Apr. 23, 2010.

(51) Int. Cl.
*E04H 7/00* (2006.01)

(52) U.S. Cl.
USPC .............................................. 52/192; 49/349

(58) Field of Classification Search
CPC ............... E04H 7/22; E04H 7/30; E04H 7/32; E04H 7/26
USPC ............... 52/192; 49/326, 349, 350, 360, 362
See application file for complete search history.

(56) References Cited

U.S. PATENT DOCUMENTS

| | | | | |
|---|---|---|---|---|
| 1,796,168 A * | 3/1931 | Stair | ............................... | 52/192 |
| 2,657,661 A * | 11/1953 | Robson | ..................... | 114/201 A |
| 3,339,785 A * | 9/1967 | Nugent | ......................... | 220/232 |
| 3,386,206 A * | 6/1968 | Loveless | ......................... | 49/221 |
| 4,229,907 A * | 10/1980 | Hall | ................................ | 49/362 |
| 4,625,888 A * | 12/1986 | Thompson | .................... | 220/262 |
| 5,190,182 A * | 3/1993 | Copas et al. | .................. | 220/262 |
| 2005/0198902 A1* | 9/2005 | Meyer | ............................. | 49/279 |
| 2011/0278318 A1* | 11/2011 | Vandenhurk | .................. | 220/810 |

* cited by examiner

*Primary Examiner* — Elizabeth A Plummer
(74) *Attorney, Agent, or Firm* — Crossley Patent Law; Micah C. Gunn

(57) ABSTRACT

An grain silo lid including a frame surrounding a grain silo roof lid and having a slidegate member mounted within the frame that operationally engages an actuation mechanism within the frame and that slidingly engages a plurality of roller-element bearing assemblies disposed within the frame first and second sides upon activation of the actuation mechanism to cover a top end of a grain silo.

1 Claim, 6 Drawing Sheets

GRAIN SILO LID

I claim benefit of my US Provisional Application No. 61/327,276 filed on Apr. 23, 2010.

BACKGROUND OF THE INVENTION

Various types of grain silo lids are known in the prior art. However, what is needed is device that does not require a grain silo operator to climb atop the grain silo roof to open and close the roof by providing a frame surrounding a grain silo roof lid and having a slidegate member mounted within the frame that operationally engages an actuation mechanism within the frame and that slidingly engages a plurality of roller-element bearing assemblies disposed within the frame first and second sides upon activation of the actuation mechanism to cover a top end of a grain silo.

FIELD OF THE INVENTION

The present invention relates to grain silos, and more particularly, to a grain silo lid.

SUMMARY OF THE INVENTION

The general purpose of the present grain silo lid, described subsequently in greater detail, is to provide an grain silo lid which has many novel features that result in an grain silo lid which is not anticipated, rendered obvious, suggested, or even implied by prior art, either alone or in combination thereof.

To accomplish this, the present grain silo lid replaces a grain silo roof cap or lid that currently has to be manually opened by physically climbing to the top of the grain silo by pulling on a rope. The present grain silo lid includes a slide gate which is powered by a small reversible motor that drives a screw shaft or a rack and pinion gear to alternately move the slide gate to an open and closed position. The motor is in operational communication with a controller disposed at ground level. When the controller is in manual operational mode, flipping a controller switch opens or closes the roof as desired. When the controller is set to an automatic operational mode, the roof opens when aeration fans are activated allowing air to exit the grain silo and prevent the roof from exploding when the vents are frozen. The framework that supports the slide gate is adaptable to fit on new grain silos as well as to the peak rings of most existing grain silo types.

Thus has been broadly outlined the more important features of the present grain silo lid so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
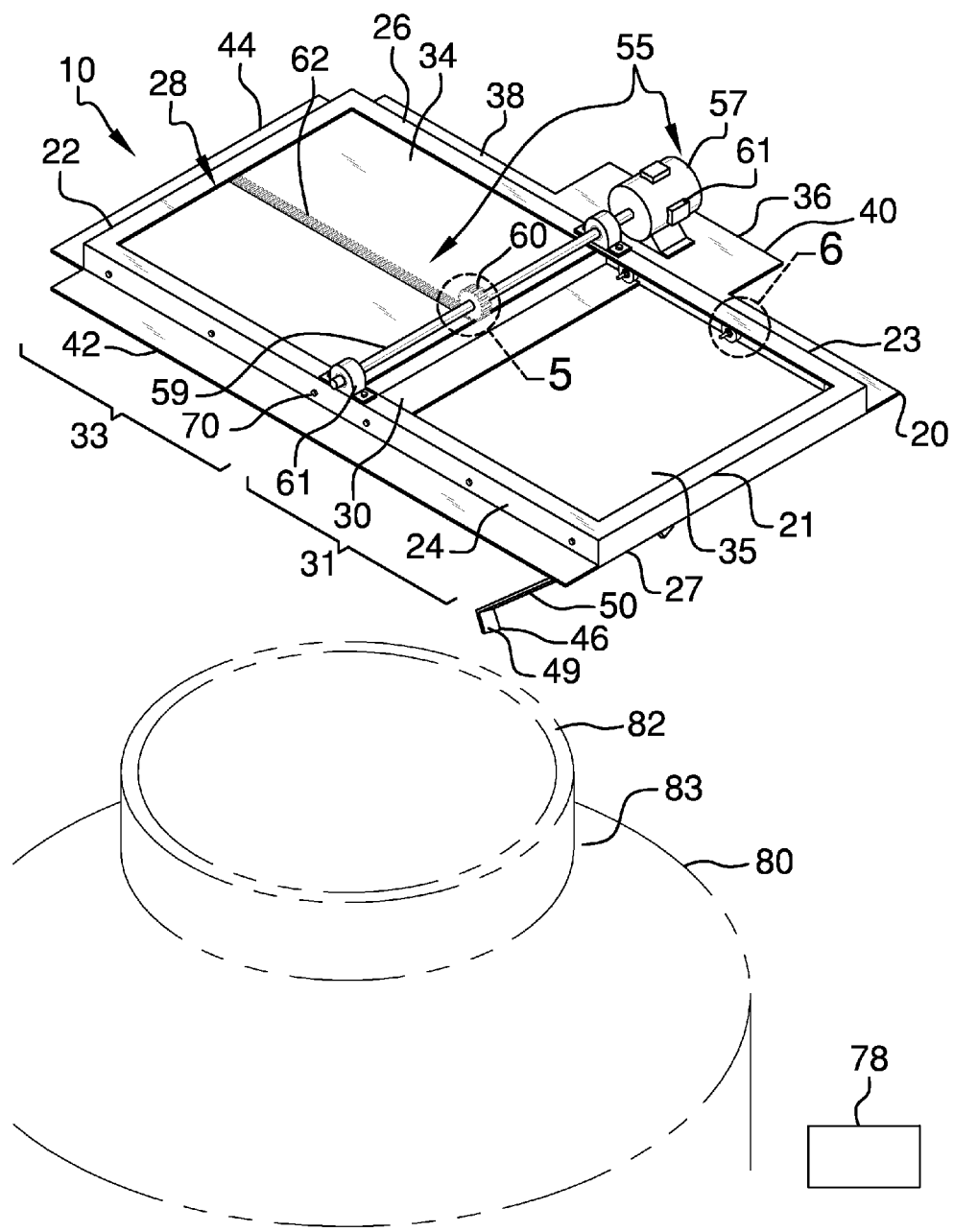
FIG. 1 is an in-use isometric view illustrating a motor in operational communication with a gear centrally disposed within a frame.
Figure 2:
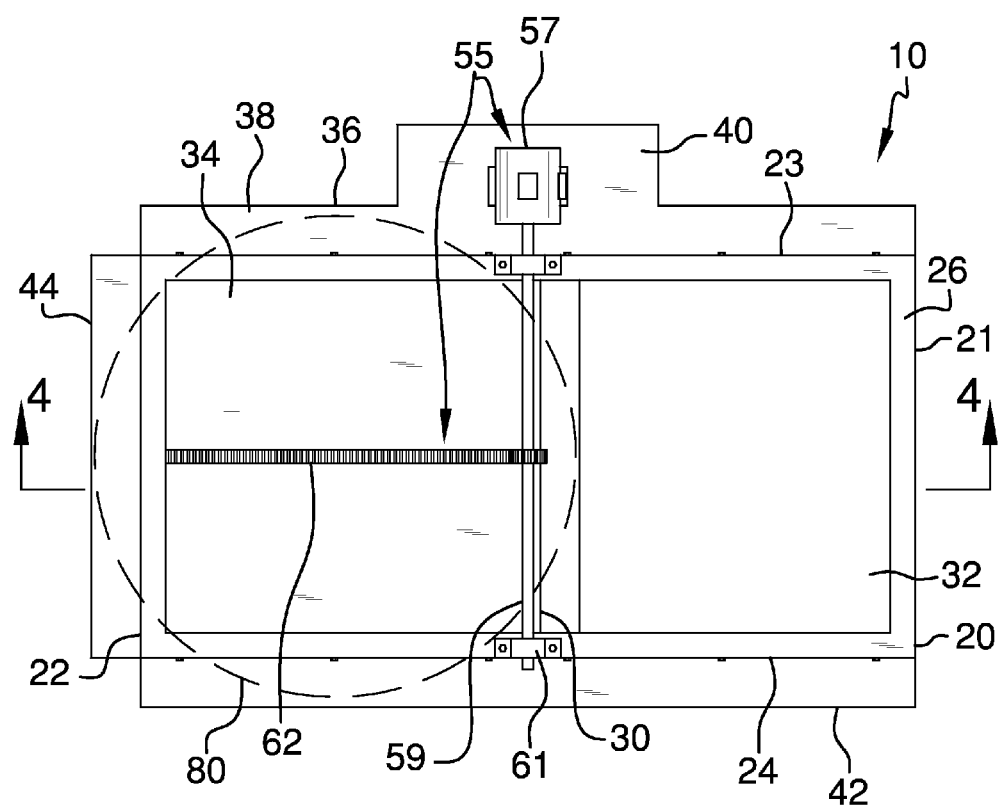
FIG. 2 is a top plan view.
Figure 3:
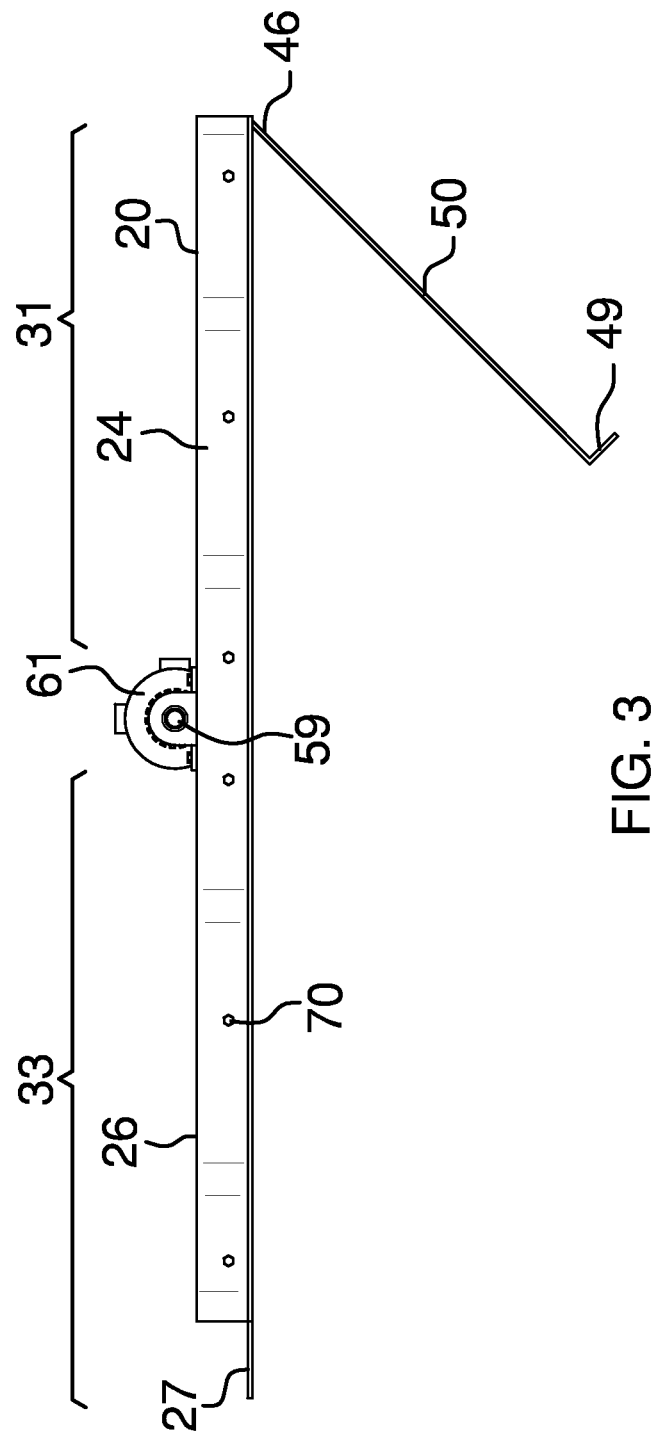
FIG. 3 is a side elevation view.
Figure 4:
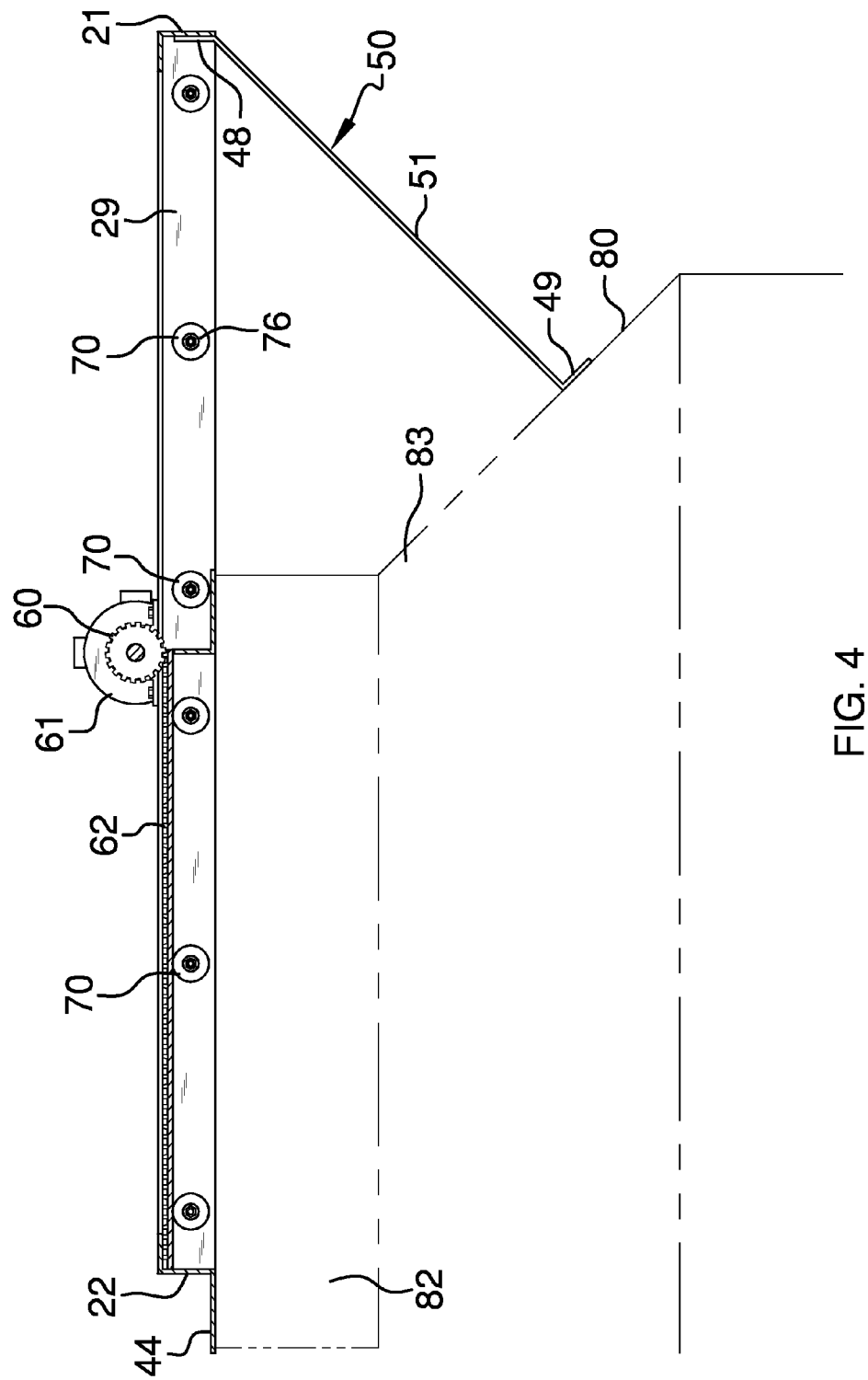
FIG. 4 is a cross-sectional view taken along line 4-4 of FIG. 2.
Figure 5:
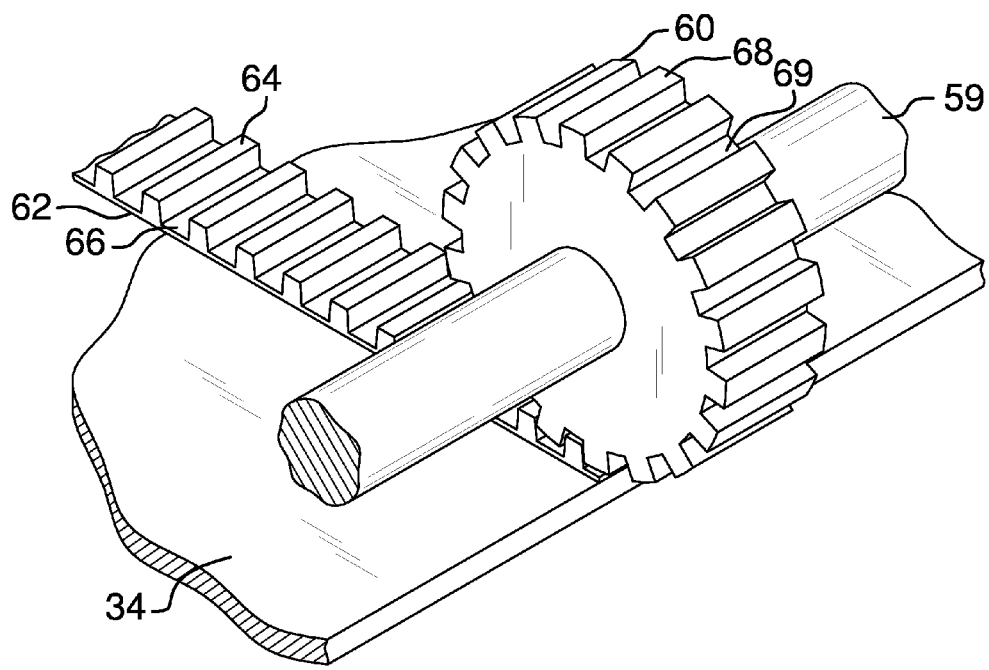
FIG. 5 is a detail view of a gear shown in FIG. 1.
Figure 6:
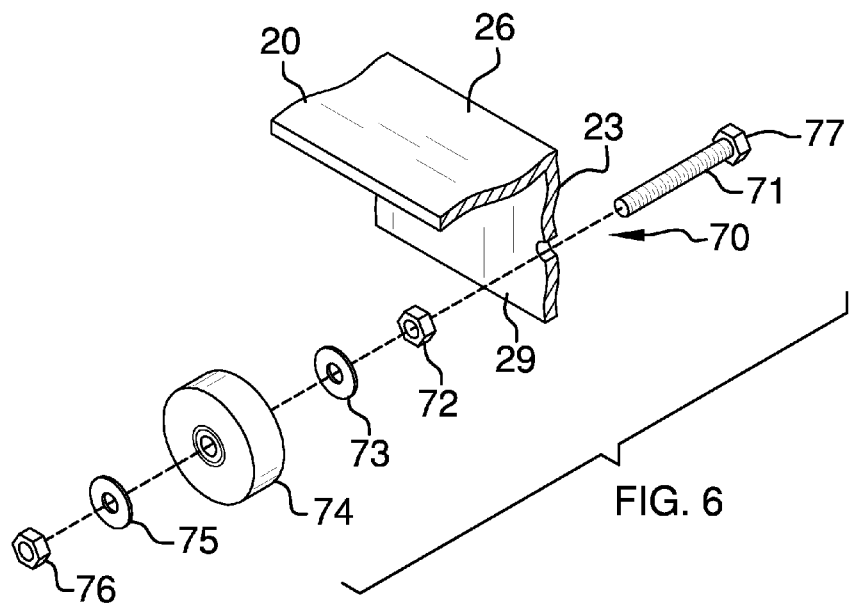
FIG. 6 is a detail view of a bearing shown in FIG. 1.
Figure 7:
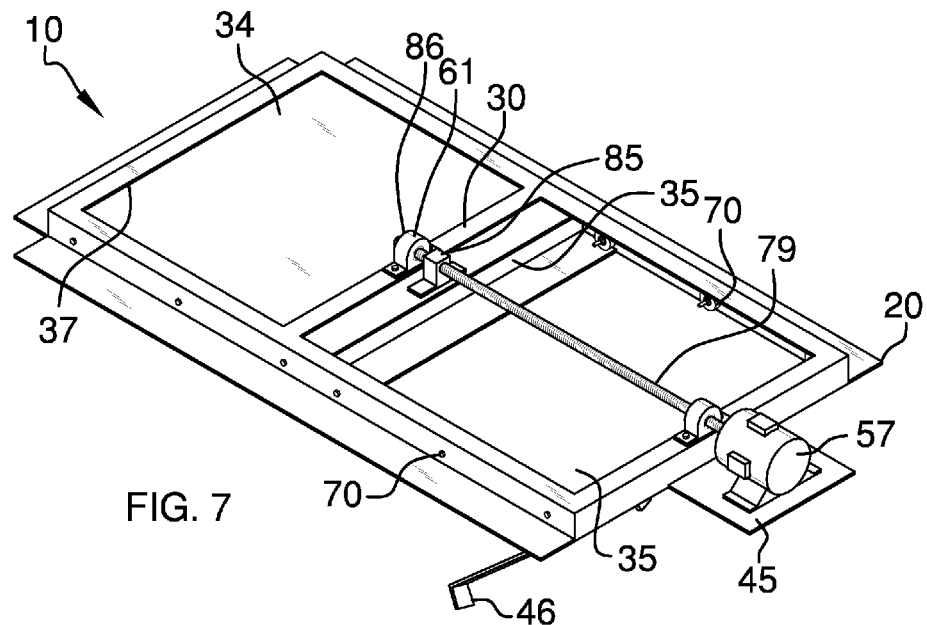
FIG. 7 is an isometric view illustrating a motor base in operational communication with a worm drive and disposed in an alternate position.
Figure 8:
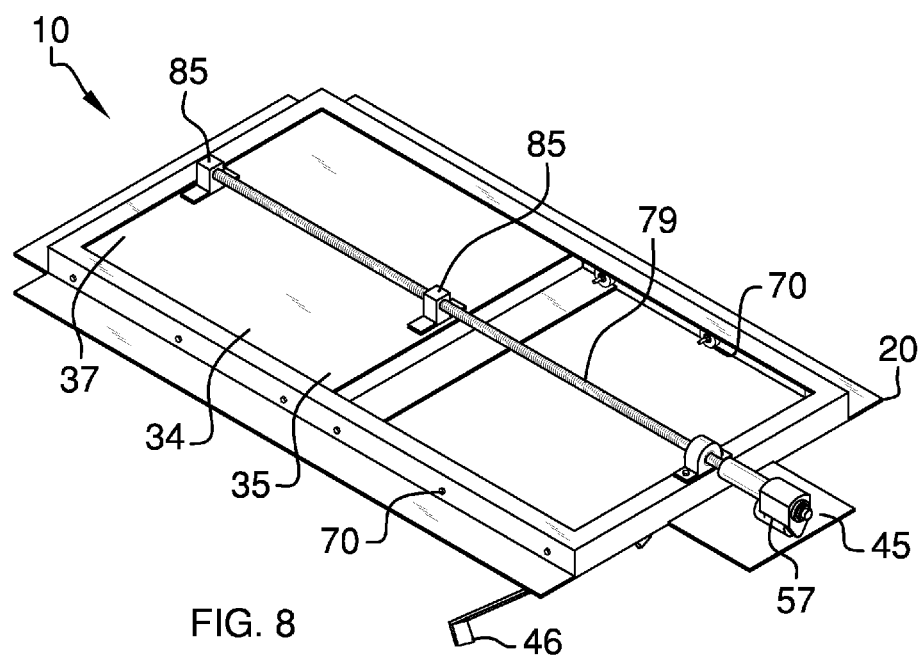
FIG. 8 is an isometric view illustrating a geared motor in operational communication with a worm drive guided by a pair of worm sleeves.

With reference now to the drawings, and in particular FIGS. 1 through 8 thereof, example of the instant grain silo lid employing the principles and concepts of the present grain silo lid and generally designated by the reference number 10 will be described.

Referring to FIGS. 1 through 8 a preferred embodiment of the present grain silo lid 10 is illustrated. The present grain silo lid 10 replaces a grain silo 80 roof cap or lid that currently has to be manually opened by physically climbing to the top of the grain silo 80 by pulling on a rope. The grain silo lid 10 includes a slide gate frame 20 mounted to a mounting ring 82 disposed on a top end 83 of a grain silo 80. The frame 20 has a front end 21, a rear end 22, a first side 23, a second side 24, a top side 26, a bottom side 27 and a center portion 28 disposed between the front end 21, the rear end 22, the first and second sides 23, 24, the top side, and the bottom side 27. A crossmember 30 is continuously disposed between the first side 23 and the second side 24 along a central horizontal axis of the frame 20 center portion 28. The crossmember 30 divides the center portion 28 into a forward half 31 and a rearward half 33. A continuous opening 35 is centrally disposed within the center portion 28 forward half 31.

A first flange 36 is continuously disposed along the first side 23 on the bottom side 27. The first flange 36 has a first section 38 and a central second protrusion 40 extending therefrom. A second flange 42 is continuously disposed along the second side 24 on the bottom side 27. A third flange 44 is continuously disposed along the rear end 22 on the bottom side 27. The flanges 36, 42, 44 form a flashing around the grain silo 80 top end 82 to prevent the entry of precipitation or other liquids into the grain silo 80, thereby keeping the contents of the grain silo dry.

A brace 46 having an upper end 48, a lower end 49, and an elongated midportion 50 disposed therebetween is provided. The brace 46 upper end 48 is attached to the bottom side 28 proximal to the front end 21. The lower end 49 is disposed at approximately a 90-degree angle to the midportion 50 toward a forward side 51 of the midportion 50. The upper end 48 is disposed at an angle to the midportion 50 in a direction opposite from the angle of the lower end 49.

A slidegate member 34 is slidingly disposed within the rearward half 33 and alternately slidingly disposed within the forward half 31. An actuation mechanism 55 is in operational communication with the slidegate member 34 to move the slidegate member 34 from a closed position in which the slidegate member 34 completely covers the opening 32 disposed in the forward half 31 to an open position in which the slidegate member 34 is disposed in the entire rearward half 33. The actuation mechanism 55 includes a motor 57 disposed on the first flange 26 second protrusion 40, a cylindrical axle 59 in operational communication with the motor 57 disposed along a central horizontal axis of the frame 20, a gear wheel 60 centrally disposed on the cylindrical axle 59, a mounting bracket 61 disposed on the frame 20 top side 26 proximal to each of the first side 23 and the second side 24, and a gear track 62 continuously disposed along a central longitudinal axis of the slidegate member 34. The gear track 62 includes a plurality of spaced apart first teeth 64 and a first notch 66 disposed between each of the teeth 64. The first notches 66 and the first teeth 64 operationally engage a plurality of spaced apart second teeth 68 and a second notch 69 disposed between each of the second teeth 68, respectively, of the gear wheel 60. The cylindrical axle 59 rotatingly engages the mounting brackets 60. The actuation mechanism 55 is equipped with limit switches which stop and lock the slidegate member 34 in the open position and in the alternate closed position.

Upon activation of the gear track 62, the slidegate member 34 slidingly engages a plurality of spaced apart roller-element bearing assemblies 70 disposed along the entire first side 23 and the entire second side 24 between the top side 26 and the bottom side 27. Each roller-element bearing assembly 70 includes a bolt 71 inserted through an inside wall 29 of the frame 20 on one of the first side 23 and the second side 24 as well as a first nut 72, a first washer 73, a roller bearing 74, a second washer 75, and a second nut 76 with the first nut 72 disposed against the frame 20 inside wall 29 closest to a head 77 of the bolt 71, which is disposed on an opposite side of the inside wall 29, and with the second nut 76 disposed farthest from the bolt 71 head 77, and the roller bearing 74 centrally disposed between the first washer 73 and the second washer 75. The roller bearing assemblies 70 permit the slidegate member 34 to slide smoothly with little resistance. In addition, the roller bearing assemblies 70 eliminate the slidegate member 34 from being frozen into a static position. A controller 78 disposed at ground level proximal to the grain silo 80 is in operational communication with the motor 61. The controller 78 may be manually operated or set to an automatic operational mode such as to activate upon the activation of aeration fans within the grain silo 80.

The actuation mechanism 55 is alternately disposed with the motor 57 disposed on a fourth flange 45 centrally disposed on the front end 21; a worm drive 79, that replaces the cylindrical axle 59, the wheel gear 60, and the wheel track 62, in operational communication with the motor 57 disposed along a central vertical axis of the frame 20; a mounting bracket 61 disposed on the crossmember 30; and a worm sleeve 85 disposed on the slidegate member 34 proximal to an internal end 35 of the slidegate member 34. The worm drive 79 rotatingly engages the mounting bracket 61 and the worm sleeve 85. A bearing 86, disposed within the mounting bracket 61, operationally engages the worm drive 79. Activation of the motor 57 activates the worm drive 79 and the bearing 86, which turn clockwise to slide the slidegate member 34 into a closed position over the opening 35 and alternately turn counter-clockwise to slide the slidegate member 34 into an open position. The actuation mechanism 55 alternately may dispense with the mounting bracket 61, and that does not include the crossmember 30, the mounting bracket 61, and the bearing 68 within the mounting bracket 61, and replace the mounting bracket 61 with an additional worm sleeve 85 disposed on the slidegate 34 proximal to an external end 37 wherein activation of the motor 57 activates the worm drive 79, which turns clockwise within each of the worm sleeves 85 to slide the slidegate member 34 into a closed position over the opening 35 and alternately turns counter-clockwise to slide the slidegate member 34 into an open position.

What is claimed is:
1. A grain silo lid comprising:
  a frame configured to surround a grain silo roof lid, wherein the frame is mounted to a mounting ring disposed on a top end of a grain silo, the frame having a front end, a rear end, a first side, a second side, a top side, a bottom side, and a center portion disposed between the front end, the rear end, the first and second sides, the top side, and the bottom side, the center portion having a forward half and a rearward half;
  a continuous opening centrally disposed within the forward half of the center portion;
  a motor-powered slidegate member mounted within the frame, the slidegate member slidingly disposed within the rearward half and alternately slidingly disposed within the forward half;
  an actuation mechanism in operational communication with the slidegate member wherein the slidegate member is transformed from a closed position in which the slidegate member completely covers the opening disposed in the forward half to an open position in which the slidegate member is disposed in the entire rearward half;
  a plurality of roller-element bearing assemblies disposed along the entire first side and the entire second side between the top side and the bottom side of the frame, wherein the slidegate member slidingly engages the roller-element bearing assemblies upon activation of the actuation mechanism;
  wherein the slidegate member is configured to cover the top end of the grain silo;
  a crossmember continuously disposed between the first side and the second side along a central horizontal axis of the center portion of the frame, wherein the crossmember divides the center portion into the forward half and the rearward half;
  a first flange continuously disposed along the first side on the bottom side, the first flange having a first section and a central second protrusion extending therefrom;
  a second flange continuously disposed along the second side on the bottom side;
  a third flange continuously disposed along the rear end on the bottom side;
  a brace attached to the frame, wherein the brace secures the frame to the grain silo;
  wherein each roller-element bearing assembly comprises:
    a bolt disposed through an inside wall of the frame on one of the first side and the second side;
    a first nut;
    a first washer;
    a roller bearing;
    a second washer;
    a second nut;
    wherein the first nut is disposed against the inside wall of the frame closest to a head of the bolt, the bolt disposed on an opposite side of the inside wall;
    wherein the second nut is disposed farthest from the bolt head;
    wherein the roller bearing is centrally disposed between the first washer and the second washer;
  wherein the brace comprises an upper end, a lower end, and an elongated midportion disposed therebetween, wherein the upper end attaches to the frame bottom side proximal to the front end;
  wherein the lower end is disposed at approximately a 90-degree angle to the midportion toward a forward side of the midportion;
  wherein the upper end is disposed at an angle to the midportion in a direction opposite from the angle of the lower end;
  a controller disposed at ground level proximal to the grain silo is in operational communication with the motor;
  a fourth flange centrally disposed on the front end;
  wherein the actuation mechanism comprises:
    a motor disposed on the fourth flange;
    a power source in operational communication with the motor; and a worm drive in operational communication with the motor, the worm drive disposed along a central vertical axis of the frame;
a first worm sleeve disposed on the slidegate member proximal to an internal end of the slidegate member;
a second worm sleeve disposed on the slidegate proximal to an external end of the slidegate member;
a plurality of spaced apart roller-element bearing assemblies disposed along the entire first side and the entire second side between the top side and the bottom side, wherein the slidegate member slidingly engages the roller-element bearing assemblies;
wherein activation of the motor activates the worm drive;
wherein upon activation of the worm drive, the worm drives engage the slidegate member;
wherein upon engagement of the slidegate member by the worm drive, the slidegate member slides over the roller-element bearing assemblies into a closed position over the opening and alternately into an open position.

* * * * *